United States Patent [19]

Fujimatsu et al.

[11] Patent Number: 5,913,971
[45] Date of Patent: Jun. 22, 1999

[54] INKJET INK AND PROCESS FOR THE PRODUCTION THEREOF

[75] Inventors: Shinya Fujimatsu; Motonori Ando; Yasuharu Iida, all of Tokyo, Japan

[73] Assignee: Tokyo Ink Manufacturing Co., Ltd., Tokyo, Japan

[21] Appl. No.: 08/897,974

[22] Filed: Jul. 25, 1997

Related U.S. Application Data

[63] Continuation of application No. 08/614,066, Mar. 12, 1996, abandoned.

[30] Foreign Application Priority Data

Mar. 17, 1995 [JP] Japan .................................. 7-058337
Jul. 14, 1995 [JP] Japan .................................. 7-178314

[51] Int. Cl.$^6$ .................................................. C09D 11/00
[52] U.S. Cl. ........................................ 106/31.86; 524/562
[58] Field of Search ........................ 524/562; 106/20 D, 106/31.86

[56] References Cited

U.S. PATENT DOCUMENTS

| | | | |
|---|---|---|---|
| 5,114,479 | 5/1992 | Keaveney et al. | 106/30 |
| 5,172,133 | 12/1992 | Suga et al. | 346/1.1 |
| 5,192,361 | 3/1993 | Schilling | 106/20 R |
| 5,302,631 | 4/1994 | Yamada et al. | 523/160 |
| 5,316,575 | 5/1994 | Lent et al. | 106/20 R |

FOREIGN PATENT DOCUMENTS

| | | |
|---|---|---|
| 0 441 987 | 8/1991 | European Pat. Off. |
| 0 473 160 | 3/1992 | European Pat. Off. |
| 0 685 536 | 12/1995 | European Pat. Off. |
| 2 225 788 | 6/1990 | United Kingdom. |

*Primary Examiner*—Peter D. Mulcahy
*Attorney, Agent, or Firm*—Wenderoth, Lind & Ponack, L.L.P.

[57] ABSTRACT

An inkjet ink having sufficient water resistance on a recording sheet but having excellent re-solubility in an ink in a head portion and excellent ejection stability through a nozzle, the inkject ink comprising an aqueous liquid, a pigment and a water-soluble resin, the water-soluble resin being a terpolymer obtained from acrylic acid, styrene and α-methyl styrene and having a weight average molecular weight of 2,000 to 8,000 and an acid value of 90 to 130, and a process for the production of the inkjet ink, which comprises preparing a concentrated aqueous dispersion of a pigment and a terpolymer obtained from acrylic acid, styrene and α-methylstyrene, adding water and an additive to the concentrated dispersion to dilute the concentrated dispersion and maintaining the diluted dispersion at a temperature between 60° C. and 80° C. for 5 to 48 hours.

9 Claims, No Drawings

5,913,971

INKJET INK AND PROCESS FOR THE PRODUCTION THEREOF

This application is a continuation of now abandoned application Ser. No. 08/614,066, filed Mar. 12, 1996.

FIELD OF THE INVENTION

The present invention relates to an inkjet ink having excellent water resistance and a process for the production thereof.

PRIOR ART OF THE INVENTION

As a conventional recording liquid for inkjet, there is often used a solution prepared by dissolving a water-soluble dye such as an acidic dye, a substantive dye or a basic dye in a mixture of a glycol-containing solvent and water, as is disclosed in JP-A-53-61412, JP-A-54-89811 and JP-A-55-65269. The water-soluble dye is generally selected from dyes having high solubility in water for achieving the stability of the recording liquid, and as a result, there is a problem in that an inkjet recorded product is poor in water resistance so that a dye constituting a recorded portion easily bleeds when water is spilled thereon.

For overcoming the above poor water resistance, attempts have been made to change the dye in structure or prepare a recording liquid having high basicity, as is disclosed in JP-A-56-57862. Further, attempts have been made to utilize a reaction between a recording sheet and a recording liquid to improve a recorded product in water resistance, as is disclosed in JP-A-50-49004, JP-A-57-36692, JP-A-59-20696 and JP-A-59-146889.

The above attempts are remarkably successful when certain kinds of recording sheets are used. However, an inkjet method uses recording sheets of various kinds, and a recording liquid containing a water-soluble dye achieves no sufficient water resistance of a recorded product in many cases.

There is a recording liquid having good water resistance, obtained by dispersing or dissolving an oil-soluble dye in a solvent having a high boiling point or by dissolving an oil-soluble dye in a volatile solvent. However, these recording liquids are environmentally unacceptable in some cases due to the odor and discharge of the solvent, and the requirement to recover the solvent may be problem when a large volume of recording is conducted or a recording apparatus is placed in some place.

For improving a recorded product in water resistance, therefore, it is under way to develop a recording liquid which is a dispersion of a pigment in an aqueous medium.

However, differing from a dye, a pigment is insoluble in a recording (aqueous) medium, and it is difficult to disperse the pigment as fine particles and maintain the resultant dispersion in a stable state.

On the other hand, as a printer used in an ink jet method is desired to have a high resolution, the nozzle diameter of the printer decreases, and it is accordingly required to decrease the diameter of a pigment. With a decrease in the diameter of a pigment, it is getting difficult to maintain the dispersion of a recording liquid in a stable state.

A pigment characteristically has excellent water resistance and light fastness over a dye, and a pigment used for an inkjet method is required not only to exhibit the above characteristic features but also to be improved so as to have properties equivalent to, or higher than, a dye with regard to adjustment suitable for ejection (inkjetting) conditions of a recording liquid, stability in storage for a long period of time, fixing to a recording sheet such as paper, the color of an image, freedom of bleeding of an ink, and the like.

An ink which is a dispersion of a pigment is required to have contradicting properties required of a dispersion or solution of a dye in addition to the above properties, i.e., the re-solubility (re-dispersibility) in a recording liquid (a dye remaining in an inkjet nozzle should be re-dissolved or re-dispersed in a recording liquid (ink)) and the water resistance of the ink on a recording sheet (paper). A resin soluble in water is advantageous in view of the re-solubility (re-dispersibility), but its solubility in water is detrimental to the water resistance on a recording sheet. When a resin dispersible in water is used, it is good for the water resistance on a recording sheet, while an ink adhering to a head portion is built up due to the lack of re-solubility (re-dispersibility) so that the stable ejection of the ink is no longer possible or that the cleaning mechanism of the head portion does not function properly. As a result, the nozzle is clogged.

SUMMARY OF THE INVENTION

It is an object of the present invention to provide an inkjet ink which has sufficient water resistance on a recording sheet but has excellent re-solubility in an ink in a head portion and excellent ejection stability through a nozzle.

According to the present invention, there is provided an inkjet ink comprising an aqueous liquid, a pigment and a water-soluble resin, the water-soluble resin being a terpolymer obtained from acrylic acid, styrene and α-methyl styrene and having a weight average molecular weight of 2,000 to 8,000 and an acid value of 90 to 130.

According to the present invention, further, there is provided a process for the production of an inkjet ink, which comprises preparing a concentrated aqueous dispersion of a pigment and a terpolymer obtained from acrylic acid, styrene and α-methylstyrene, adding water and an additive to the concentrated dispersion to dilute the concentrated dispersion and maintaining the diluted dispersion at a temperature between 60° C. and 80° C. for 5 to 48 hours.

DETAILED DESCRIPTION OF THE INVENTION

The inkjet ink of the present invention generally contains 1 to 5% by weight of a pigment, 0 to 1% by weight of a dye, 0 to 0.5% by weight, preferably 0.03 to 0.5% by weight, of a biocide, 0 to 0.5% by weight of a chelating agent, 0.5 to 10% by weight of a terpolymer obtained from acrylic acid, styrene and α-methylstyrene, 0 to 35% by weight of an aqueous (water-soluble) solvent and 50 to 95% by weight of water.

The terpolymer obtained from acrylic acid, styrene and α-methylstyrene, used in the present invention, serves to stabilize the dispersion of the pigment, and the inkjet ink contains 0.5 to 10% by weight. When the amount of the terpolymer is less than the above lower limit, the carbon black used as a pigment increases the electrical conductivity of the ink, which may increase the risk of a short circuit being caused in a deflecting electrode, etc., of a multi-head of a continuous type. When the amount of the terpolymer is greater than the above upper limit, it is difficult to maintain the viscosity of the ink at a low level so that no liquid drops are sufficiently formed.

The terpolymer obtained from acrylic acid, styrene and α-methylstyrene has a weight average molecular weight of 2,000 to 8,000, preferably 2,000 to 5,000. When the weight average molecular weight of the terpolymer is in the above range, desirably, the dispersibility of the pigment is excellent and the ejection stability of the ink is excellent. Further, the resistance value of the set-solid print of the ink can be maintained in a proper range.

The above terpolymer has an acid value of 90 to 130. When the acid value of the terpolymer is in the above range, desirably, the water resistance on a recording sheet (paper) and the re-solubility of the ink in a head portion are excellent, and the resistance value of a set-solid print of the ink can be maintained in a proper range.

The terpolymer from acrylic acid, styrene and α-methylstyrene can be produced by a known method. When the terpolymer is produced, the total amount of styrene and α-methylstyrene per mole of acrylic acid is preferably 3 to 5 mol.

Further, per mole of acrylic acid, the amount of styrene is 1.5 to 4.0 mol, preferably 1.7 to 3.5 mol, and the amount of α-methylstyrene is 0.3 to 2.5 mol, preferably 0.5 to 2.5 mol. When a terpolymer obtained from acrylic acid, styrene and α-methylstyrene in the above amount ratios is used, there is obtained an inkjet ink which is well-balanced among various properties such as the stability of the terpolymer in the form of a dispersion, water resistance on a recording sheet (paper), the re-solubility of the terpolymer and a high resistance value on a formed set-solid image.

In the inkjet ink of the present invention, a neutralizing agent is used for maintaining a stable solution of the above terpolymer in ink liquid components. The neutralizing agent is selected from hydroxides of alkali metals such as sodium and potassium, aliphatic amines, alcohol amines such as ethanolamine, propanolamine and methylethanolamine, morpholine, N-methylmoropholine, dimethylaminoethanol and diethylaminoethanol. When the above neutralizing agent is used in an amount equimolar to, or greater than, the amount of the acrylic acid unit of the above terpolymer, preferably greater by several mol %, the inkjet ink is further improved in various properties such as the solubility of the terpolymer, the maintenance of the re-solubility and the water resistance on a recording sheet (paper).

The pigment in the present invention is selected from pigments such as carbon black and organic pigments.

Examples of the organic pigments include insoluble azo pigments such as Toluidine Red, Toluidine Maroon, Hansa Yellow, Benzidine Yellow and Pyrazolone Red; soluble azo pigments such as Lithol Red, Helio Bordeaux, Pigment Scarlet and Permanent Red 2B; derivatives of vat dyes such as alizarine, indanthrone and Thioindigo Maroon, phthalocyanine pigments such as Phthalocyanine Blue and Phthalocyanine Green, quinacridone pigments such as Quinacridone Red and Quinacridone Magenta; perylene pigments such as Perylene Red and Perylene Scarlet; isoindolinone pigments such as Isoindolinone Yellow and Isoindolinone Orange; pyranthrone pigments such as Pyranthrone Red and Pyranthrone Orange; thioindigo pigments; fused azo pigments; and other Flavanthrone Yellow, Acylamide yellow, Quinophthalone Yellow, Nickel Azo Yellow, Copper Azomethine Yellow, Perinone Orange, Anthrone Orange, Dianthraquinonyl Red and Dioxazine Violet.

As a carbon black, any one of neutral carbon black, basic carbon black and acidic carbon black may be used. Specific examples of the carbon black include MA-7, MA100, MA8, MA11, No. 50, No. 2300, No. 950, No. 850 and MCF88 supplied by Mitsubishi Chemical Co., Ltd., Printex 95, 90, 85, 75, 55, 45 and 40, Color Black FW18 and S160 and Special Black 550 and 350 supplied by Degssa Japan Co., Ltd., RAVEN 1030, 850, 760, 780, 500, 1255, 1250 and 1500 supplied by Columbian Carbon Japan Ltd., Black PEAR, VULCAN XC, P, REGAL 550R, 330I and ELFEX8 supplied by Cabot Corporation, and Seast 5H and 3H supplied by Tokai Carbon Co., Ltd.

The pigment used in the present invention is preferably selected from carbon black, phthalocyanine pigments, azo pigments, quinacridone pigments and isoindolinone pigments.

The above pigment may be used in an aqueous dispersed state just after it is produced, or it is preferred to adjust the pigment by various methods of forming fine particles (e.g., acid pasting) such that the pigment is suitable for use in the present invention. A commercially available dispersion in which the pigment is dispersed in advance may be used.

The pigment used in the present invention may be dispersed in an aqueous medium together with the terpolymer, or the pigment may be kneaded with the terpolymer and then dispersed in an aqueous medium, when the inkjet ink is produced.

After dispersed, the pigment has an average particle diameter, measured by a laser scattering method, of 0.5 $\mu$m or less, preferably 0.2 $\mu$m or less, more preferably 0.1 $\mu$m or less. When the pigment has an average particle diameter in the above range, the ejection of the ink at a recording time is stable, the filtering procedure at the time of producing the ink is easy, and the precipitation in the ink with the passage of time hardly takes place.

The amount of the pigment in the ink is 0.5 to 5% by weight, preferably 1 to 5% by weight. When the amount of the pigment is smaller than the above lower limit, the image density and the color reproduction are insufficient. When the amount of the pigment is greater than the above upper limit, the stability of the ejection of the ink greatly decreases, and the nozzle is liable to be clogged frequently. Further, it may be difficult to adjust the viscosity of the ink.

For adjusting the color tone, adjusting the optical density of a recorded product and adjusting the properties of the ink, the inkjet ink of the present invention may contain a dye in combination in a form which does not affect the water resistance and the light fastness of the ink. Since, however, the dye may degrade the dispersion stability of the pigment, the amount of the dye based on the pigment is required to be 40% by weight or less, preferably 25% by weight or less.

The dye is selected from an acidic dye, a basic dye, a substantive dye, a reactive dye, a disperse dye and a metal-containing dye. A purified dye from which an inorganic salt is removed is preferred as a dye.

The dye includes C. I. Direct Black 17, 19, 32, 51, 71, 108, 146, 154 and 166, C. I. Acid Black 2, 7, 24, 26, 31, 52, 63, 112 and 118, C. I. Basic Black 2, C. I. Direct Blue 6, 22, 25, 71, 90 and 106, Food Black 1 and 2, lithium- or potassium-substituted products of Food Black 2, C. I. Acid Blue 9, 22, 40, 59, 93, 102, 104, 113, 117, 120, 167, 229 and 234, and C. I. Basic Blue 1, 3, 5, 7, 9, 24, 25, 26, 28 and 29.

The liquid component of the inkjet ink of the present invention includes water and an aqueous (water-soluble) solvent.

The water as a medium for the ink includes deionized water or distilled water from which metal ions, etc., are removed, and the ink contains 50 to 95% by weight of the water.

The aqueous (water-soluble) solvent works as a preventer to prevent the drying of the ink to solidness in a nozzle portion for stable ejection of the ink and to prevent the drying of a nozzle with the passage of time for maintaining the nozzle in a wet state. The amount of the aqueous (water-soluble) solvent is used in an amount of 0 to 50% by weight, preferably 1 to 35% by weight.

The aqueous (water-soluble) solvent includes ethylene glycol, diethylene glycol, propylene glycol, triethylene glycol, polyethylene glycol, glycerin, tetraethylene glycol, dipropylene glycol, ketone alcohol, diethylene glycol monobutyl ether, ethylene glycol monobutyl ether, ethylene glycol monoethyl ether, 1,2-hexanediol, N-methyl-2-pyrrolidone, substituted pyrrolidone, 2,4,6-hexanetriol, tetrafurfuryl alcohol and 4-methoxy-4-methylpentanone. The above solvents may be used alone or in combination.

Further, for increasing the drying rate of the ink on a recording sheet (paper), an alcohol such as methanol, ethanol or isopropyl alcohol may be used.

When the recording sheet is a material having permeability such as paper, a penetrant may be added for increasing the penetration of the ink into the recording sheet and increasing the apparent drying rate of the ink on the recording sheet.

The above penetrant is selected from glycol ethers such as diethylene glycol monobutyl ether, etc., included in the above aqueous solvent, alkylene glycol, polyethylene glycol monolauryl ether, sodium laurylsulfate, sodium dodecylbenzenesulfonate, sodium oleate and sodium dioctylsulfosuccinate. The penetrant is used in an amount of 0 to 5% by weight, preferably 1 to 5% by weight, based on the ink. The penetrant has a sufficient effect when used in an amount in the above range, and when the amount of the penetrant exceeds the above upper limit, undesirably, a printed character (image, etc.) may bleed or "strike-through" may take place.

The biocide works to prevent the occurrence of mildew in the ink, and is selected from sodium dehydroacetate, sodium benzoate, sodium pyridinethione-1-oxide, zinc pyridinethione-1-oxide, 1,2-benzisothiazolin-3-one and amine salts of 1,2-benzisothiazolin-3-one. The amount of the biocide based on the ink is 0 to 0.5% by weight, preferably 0.03 to 0.5% by weight.

The chelating agent works to block metal ion in the ink and to prevent the precipitation of a metal in a nozzle portion and the precipitation of an insoluble in the ink. The chelating agent is selected from ethylenediamine tetraacetic acid, sodium salt of ethylenediamine tetraacetic acid, diammonium salt of ethylenediamine tetraacetic acid and tetrammonium salt of ethylenediamine tetraacetic acid. The amount of the chelating agent based on the ink is 0 to 0.5% by weight.

For adjusting the pH of the ink and preventing the corrosion of an ink-tubing in a recording apparatus (printing machine), a pH adjuster such as an amine, an inorganic salt or ammonia and a buffer solution such as phosphoric acid may be used.

For preventing the occurrence of foams when the ink is cycled, moved or produced, an anti-foaming agent may be used.

For improving the dispersion of the pigment and improving an image in quality, an anionic, nonionic, cationic or amphoteric surfactant or a dispersing agent may be used.

The anionic surfactant includes fatty acid salt, alkyl sulfate, alkylaryl sulfonate, alkylnaphthalene sulfonate, dialkyl sulfonate, dialkyl sulfosuccinate, alkyl diaryl ether disulfonate, alkyl phosphate, polyoxyethylene alkyl ether sulfate, polyoxyethylene alkylaryl ether sulfate, a naphthalene sulfonate formalin condensate, polyoxyethylene alkylphosphate, glycerol borate fatty acid ester, and polyoxyethylene glycerol fatty acid ester.

The nonionic surfactant includes polyoxyethylene alkyl ether, polyoxyethylene alkylaryl ether, a polyoxyethylene oxypropylene block copolymer, sorbitan fatty acid ester, polyoxyethylene sorbitan fatty acid ester, polyoxyethylene sorbitol fatty acid ester, glycerin fatty acid ester, polyoxyethylene fatty acid ester, polyoxyethylenealkylamine, a fluorine-containing nonionic surfactant and a silicon-containing nonionic surfactant.

The cationic surfactant includes alkylamine salt, quaternary ammonium salt, alkyl pyridinium salt and alkyl imidazolium salt.

The amphoteric surfactant includes alkyl betaine, alkylamine oxide and phosphatidyl choline.

Urea and dimethylurea may be added as other additive.

The inkjet ink of the present invention may further contain any one of known solvents, additives, salts and synthetic and natural resins.

The process for the production of the ink will be explained below. The pigment such as carbon black, water and an optional dispersing agent and an optional aqueous (water-soluble) solvent are mixed, and the mixture is dispersed with a sand mill, a homogenizer, a ball mill, a paint shaker or an ultrasonic dispersing machine. A solution of the terpolymer is then mixed with the dispersion. Otherwise, the pigment, the terpolymer, water, an optional dispersing agent and an optional aqueous (water-soluble) solvent are mixed, and the mixture is dispersed with a sand mill, a homogenizer, a ball mill, a paint shaker or an ultrasonic dispersing machine. Otherwise, the pigment and the terpolymer are fully kneaded with a two-roll mill, and then further dispersed in an aqueous liquid with any one of the above sand mill and the like, and then the dispersion is properly diluted with water. Then, other additive(s) is added to, and mixed with, the diluted dispersion.

The terpolymer may be used in a state in which it is fully dissolved in water in the presence of a neutralizing agent, or it is also effective to heat the water for dissolving it. It is also effective to heat the dispersion for improving the ink in stability.

The above components can be mixed and stirred with any one of a stirrer having a blade, a high-speed stirrer and an emulsifier.

The above-obtained ink mixture is fully filtered through a filter having a pore size of 3 μm or smaller, preferably through a filter having a pore size of 1.0 μm or smaller, more preferably through a filter having a pore size of 0.65 μm or smaller, particularly preferably through a filter having a pore size of 0.45 μm or smaller. Before the filtering, the ink mixture may be centrifugally filtered, whereby the clogging of the filter can be decreased, and the frequency of filter exchange can be decreased.

The ink is prepared as a liquid having a viscosity of 0.8 to 15 cps (25° C.) although the viscosity depends upon method to which a recording machine (printing machine) is adapted. The ink as a liquid has a surface tension of 25 to 60 dyn/cm. Although not specially limited, the pH of the ink is preferably in the range of from 7 to 12, particularly preferably in a weak alkaline range of from 7 to 10.

The ink of the present invention can be used with any one of a continuous type printer and a drop-on-demand type printer. For use with a continuous type printer, the electrical conductivity of the ink is adjusted such that its drops have a proper charge. Further, since the ink of the present invention has excellent re-solubility (re-dispersibility), the trouble caused by the adhering and accumulation of the ink to/on a deflecting electrode plate is decreased.

In particular, when an ink contains carbon black, there may be a problem of a short circuit being formed by a soiling of the ink mist between a deflecting electrode and its neighboring electrically conductive portion, while the ink of the present invention has a high resistance value after the ink is dried, and this problem can be decreased.

In particular, the ink after dried can have a high resistance value when the dispersion of the ink is heated. Specifically, the ink has a resistance value of at least $10^6 \Omega$ (interelectrode distance 5 mm), preferably at least $10^7 \Omega$, on a set-solid print surface, so that the above trouble can be remarkably decreased.

It is assumed that it is because a phenomenon of the terpolymer coating a carbon black surface that the resistance value of a set-solid print surface increases by heating and storage. This phenomenon appears to come to an end point when the ink is stored at 60 to 80° C. for approximately 5 to 24 hours. For this reason, presumably, the resistance value of the ink of a set-solid print surface no longer increases when the ink is stored further.

The ink produced according to the present invention is aqueous (water-soluble) but is excellent in water resistance, so that it can be suitably used as an inkjet ink and can be utilized in the fields of document preparation in office, symboling, marking and numbering of corrugated boards, barcodes, and the like.

The ink of the present invention is excellent in the storageability of a recorded product over an ink containing a dye.

The inkjet ink of the present invention contains water as a medium, while it gives a recorded product having excellent water resistance regardless of an article to which recording is conducted so that it can be used in the fields of document preparation in office and marking and numbering of corrugated boards.

Further, the ink of the present invention has excellent re-solubility and re-dispersibility so that it causes less trouble when the ink adheres to, and is built up on, a deflecting electrode.

When an ink contains carbon black, there may be a trouble of a short circuit being formed by the ink mist between a deflecting electrode and its neighboring electrically conductive portion, while the ink of the present invention has a high resistance value after the ink is dried, and this problem can be decreased. Since, however, the ink of the present invention has a high resistance value, the above trouble can be decreased.

The present invention will be explained with reference to Examples hereinafter, in which "part" and "%" stand for "part by weight" and "% by weight".

SYNTHESIS EXAMPLES 1–6

Terpolymers were prepared from the following monomers in molar ratios shown in the following Table by a method of producing an acrylic resin.

| Example | Acrylic acid | Styrene | α-methyl-styrene | Acid value | Molecular weight* |
|---|---|---|---|---|---|
| 1 | 1 | 1.8 | 2.0 | 105 | 3,000 |
| 2 | 1 | 1.8 | 2.1 | 102 | 5,000 |
| 3 | 1 | 2.0 | 2.0 | 100 | 2,000 |
| 4 | 1 | 2.0 | 2.2 | 95 | 3,500 |
| 5 | 1 | 2.2 | 1.9 | 100 | 4,000 |
| 6 | 1 | 1.7 | 1.8 | 115 | 3,000 |

*Weight average molecular weight

EXAMPLE 1

A 1-gallon kneader of stainless steel (supplied by Inoue Mgf. Co.) was charged with 250 parts of crude copper phthalocyanine (copper phthalocyanine supplied by Toyo Ink Manufacturing Co., Ltd.), 2,500 parts of sodium chloride, 25 parts of a blue color pigment dispersing agent (P-$[CH_2NH(CH_2)_4N(CH_3)_2]_3$, P=copper phthalocyanine residue) and 160 parts of polyethylene glycol 300 (supplied by Tokyo Kasei Kogyo Co., Ltd.), and these components were kneaded for 3 hours. The resultant mixture was poured into 2.5 l of warm water and stirred with a high-speed mixer under heat at about 80° C. for about 1 hour to form a slurry. The slurry was filtered and washed with water repeatedly five times to remove the sodium chloride and the solvent, whereby an aqueous pigment dispersion (pigment dispersion treated with pigment derivative) having a solid content of 50% was obtained.

The following materials were placed in a sand mill and dispersed to prepare a concentrated recording liquid for inkjet. The amount of the terpolymer was an amount as a solid content (The amount of each of terpolymers in the following Examples also refers to an amount as a solid content).

| | |
|---|---|
| Blue pigment (pigment dispersion treated with pigment derivative, solid content 50%) | 30 parts |
| Terpolymer obtained in Synthesis Example 1 | 3.0 parts |
| Dimethylaminoethanol | 0.1 part |
| Surfactant (Emulgen 420, supplied by Kao Corp.) | 1.0 part |
| Deionized water | 50.0 parts |
| Glycerin | 6.0 parts |

The resultant dispersion was mixed with the following materials. Then, the mixture was filtered through a membrane filter having a pore size of 0.45 μm to obtain an ink. The ink had a viscosity of 1.7 cps. The ink was measured for a particle size distribution with a laser diffraction-applied particle size distribution meter ("SALD-1100", supplied by Shimadzu Corporation) to show an average particle diameter of 104 nm.

| | |
|---|---|
| (The above dispersion | 13.5 parts) |
| Dispersing agent (Emulgen 420, supplied by Kao Corp.) | 0.2 part |
| Terpolymer obtained in Synthesis Example 1 | 1.0 part |
| Ethylene glycol | 10.0 parts |
| Biocide (Sodium Omadine, supplied by Olin Corp.) | 0.15 part |
| Sodium ethylenediamine tetraacetate | 0.02 part |
| Deionized | 63.53 parts |

The above-obtained ink was charged into a cartridge of an inkjet printer HG5130 supplied by Seiko Epson Corp (drop-on-demand piezo inkjet print method), and a recording was carried out to give excellent recorded products. When water was dropped on a print surface to see whether or not the ink would bled, the ink did not bleed and had sufficient water resistance. Further, when an absorbent cotton fixed to a stick was rubbed against a print surface 10 times, no ink adhered to the cotton.

EXAMPLE 2

The following materials were placed in a sand mill and dispersed to prepare a concentrated recording liquid for inkjet.

| | |
|---|---|
| Carbon black (MA-7, supplied by Mitsubishi Chemical Co., Ltd.) | 4.0 parts |
| Blue color pigment dispersing agent (P-$[CH_2NH(CH_2)_4N(CH_3)_2]_3$, P = copper phthalocyanine residue) | 0.1 part |
| Terpolymer obtained in Synthesis Example 2 | 3.0 parts |

-continued

| | |
|---|---|
| Dimethylaminoethanol | 0.1 part |
| Surfactant (Emulgen 420, supplied by Kao Corp.) | 0.5 part |
| Dispersing agent (Solsperse 27000, supplied by Zeneca K.K.) | 0.5 part |
| Deionized water | 50.0 parts |
| Diethylene glycol monobutyl ether | 1.0 part |

The resultant dispersion was mixed with the following materials. Then, the mixture was filtered through a membrane filter having a pore size of 0.45 μm to obtain an ink. The ink had a viscosity of 1.6 cps. The ink was measured for an average particle diameter in the same manner as in Example 1 to show 100 nm.

| | |
|---|---|
| (The above dispersion | 13.5 parts) |
| Dispersing agent (Emulgen 420, supplied by Kao Corp.) | 0.2 part |
| Terpolymer obtained in Synthesis Example 1 | 4.3 parts |
| Ethylene glycol | 10.0 parts |
| Biocide (Sodium Omadine, supplied by Olin Corp.) | 0.15 part |
| Sodium ethylenediamine tetraacetate | 0.02 part |
| Deionized water | 63.53 parts |

The above-obtained ink was charged into a cartridge of an inkjet printer HG5130 supplied by Seiko Epson Corp., and a recording was carried out to give excellent recorded products. When water was dropped on a print surface to see whether or not the ink would bled, the ink did not bleed and had sufficient water resistance. Further, when an absorbent cotton fixed to a stick was rubbed against a print surface 10 times, no ink adhered to the cotton.

EXAMPLE 3

The following materials were placed in a sand mill and dispersed to prepare a concentrated recording liquid for inject.

| | |
|---|---|
| Carbon black dispersion (Hostafine Black TS, supplied by Hoechst Industry Ltd., pigment content 33%) | 9.5 parts |
| Blue color pigment dispersing agent (P-[CH$_2$NH(CH$_2$)$_4$N(CH$_3$)$_2$]$_3$, P = copper phthalocyanine residue) | 0.1 part |
| Dye (C. I. direct black 154) | 0.5 part |
| Terpolymer obtained in Synthesis Example 2 | 3.0 parts |
| Diethylaminoethanol | 0.2 part |
| Dispersing agent (Emulgen 420, supplied by Kao Corp.) | 0.4 part |
| Dispersing agent (Solsperse 27000, supplied by Zeneca K.K.) | 0.5 part |
| Diethylene glycol monobutyl ether | 1.0 part |
| Diethylene glycol | 1.0 part |
| Biocide (Sodium Omadine, supplied by Olin Corp.) | 0.15 part |
| Sodium ethylenediamine tetraacetate | 0.02 part |
| Deionized water | 83.53 parts |

The resultant dispersion was filtered through a membrane filter having a pore size of 1 μm and then through a membrane filter having a pore size of 0.45 μm to obtain an ink. The ink had a viscosity of 1.6 cps. The ink was measured for an average particle diameter in the same manner as in Example 1 to show 94 nm.

The above-obtained ink was applied to a coat paper sheet with a No. 6 bar coater and dried, and the applied surface was measured for a resistance value with a resistivity meter MCP-T400 supplied by Mitsubishi Chemical Co., Ltd. to show $2.6 \times 10^6 \Omega$ in an inter-electrode distance of 5 mm. Further, the ink was stored at 70° C. for 12 hours, applied to a coat paper sheet and dried, and the applied surface was similarly measured for a resistance value to show more than $10^7 \Omega$.

The above two inks (not heated, and heated) were respectively charged into an inkjet printer (GXI-S, continuous method, supplied by Hitachi Ltd.), and recordings were carried out on palin paper sheets (K, supplied by Fuji Zerox Co., Ltd.) and art paper sheets. Each of the above inks permitted continuous printing without causing any trouble in a deflecting electrode portion at a printing time, and gave excellent printed products. When water was dropped on the print surface of the plain paper sheets to see whether or not the inks would bleed, no inks bled and the above inks had sufficient water resistance. Further, when an absorbent cotton fixed to a stick was rubbed against a print surface of each of the art paper sheets 10 times, no ink adhered to the cotton.

Nozzles are formed of various materials such as stainless steel, nickel and iron coated with a fluorine resin, and the like. Therefore, the above inks were respectively applied to a stainless steel sheet, a nickel sheet and an iron sheet coated with a fluorine resin and allowed to stand at room temperature for 7 days, and these sheets were immersed in the above inks to determine the solubility (dispersibility) of each dry ink surface. As a result, it was found that the above inks had excellent re-solubility (re-dispersibility).

EXAMPLES 4–10 AND COMPARATIVE EXAMPLES 1–9

Inks were produced in the same manner as in Example 3 except that the terpolymer was replaced with the following resins. The amount of each resin refers to an amount as a solid content.

| | Resin | Acid value | Molecular weight* | Amount (part) |
|---|---|---|---|---|
| Ex. 4 | Synthesis Example 3 | 100 | 2,000 | 5 |
| Ex. 5 | Synthesis Example 4 | 95 | 3,500 | 5 |
| Ex. 6 | Synthesis Example 5 | 100 | 4,000 | 5 |
| Ex. 7 | Synthesis Example 6 | 115 | 3,000 | 5 |
| Ex. 8 | Synthesis Example 4 | 95 | 3,500 | 4 |
| Ex. 9 | Synthesis Example 5 | 100 | 4,000 | 4 |
| Ex. 10 | Synthesis Example 6 | 115 | 3,000 | 4 |
| CEx. 1 | A-St | 150 | 6,800 | 4 |
| CEx. 2 | A-St | 195 | 10,000 | 5 |
| CEx. 3 | A-St | 200 | 5,000 | 5 |
| CEx. 4 | A-St | 200 | 7,000 | 4 |
| CEx. 5 | A-St | 200 | 7,500 | 5 |
| CEx. 6 | A-St | 235 | 1,600 | 5 |
| CEx. 7 | A-emulsion 1 | | | 4 |
| CEx. 8 | A-emulsion 2 | | | 5 |
| CEx. 9 | Polyester | | | 5 |

*Weight average molecular weight
Ex. = Example, CEx. = Comparative Example
A-St = styrene acrylate resin
A-emulsion 1 = styrene acrylate resin emulsion (LIOCRYL PFX0302, supplied by Nippon Polymer Industry Co., Ltd.)
A-emulsion 2 = Styrene acrylate resin emulsion (TOCRYL S740, supplied by Nippon Polymer Industry Co., Ltd.)
Polyester = water-soluble polyester resin (Z-446, supplied by Goo Chemical Industry Co., Ltd.)

When the above inks were obtained, filterability was evaluated as described below. Further, each ink was measured for a viscosity and an average particle diameter in the same manner as in Example 3, and evaluated for an ejection property, a printed state and dispersibility as described below. Further, each print was measured for a water resistance and a resistance value.

Filterability

Evaluated on the basis of an amount of an ink which was filtered through a membrane filter having a diameter of 90 mm and a pore size of 0.45 μm for a predetermined period of time (90 seconds).

Viscosity

Measured with a vibration viscometer (VM-1A-L, supplied by Yamaichi Electronic Co., Ltd.) at 25° C.

Ejection Property

A failure of a nozzle in continuous printing was evaluated on the basis of defectiveness of a printed product.

Dispersibility

An ink was stored at 50° C. for 7 days, and then measured for an average particle diameter. When the average particle diameter of an ink changed by at least 15 nm, the ink was considered defective.

TABLE 1

| | Water resistance | | Re-solubility, re-dispersibility | Filterability (l) | Viscosity (cps) |
|---|---|---|---|---|---|
| | Plain paper | Art paper | | | |
| Ex. 3 | A | A | A | 1 or more | 1.6 |
| Ex. 4 | A | A | A | 1 or more | 1.7 |
| Ex. 5 | A | A | A | 1 or more | 1.8 |
| Ex. 6 | A | A | A | 1 or more | 1.9 |
| Ex. 7 | A | A | A | 1 or more | 1.7 |
| Ex. 8 | A | A | A | 1 or more | 1.7 |
| Ex. 9 | A | A | A | 1 or more | 1.8 |
| Ex. 10 | A | A | A | 1 or more | 1.6 |
| CEx. 1 | A | B | A | 1 or more | 1.7 |
| CEx. 2 | A | B | A | 1 or more | 2.3 |
| CEx. 3 | A | B | A | 1 or more | 2.1 |
| CEx. 4 | A | B | A | 1 or more | 2.1 |
| CEx. 5 | A | B | A | 1 or more | 2.3 |
| CEx. 6 | A | B | A | 1 or more | 1.6 |
| CEx. 7 | A | A | B | 0.8 | 1.5 |
| CEx. 8 | A | A | B | 0.7 | 1.5 |
| CEx. 9 | A | B | A | 0.8 | 3.2 |

| | Ejection property | Resistance value ($\Omega$) | | Dispersibility |
|---|---|---|---|---|
| | | Before heating | After heating | |
| Ex. 3 | A | $2.6 \times 10^6$ | $10^7 \leq$ | A |
| Ex. 4 | A | $2.4 \times 10^6$ | $10^7 \leq$ | A |
| Ex. 5 | A | $2.6 \times 10^6$ | $10^7 \leq$ | A |
| Ex. 6 | A | $3.1 \times 10^6$ | $10^7 \leq$ | A |
| Ex. 7 | A | $2.9 \times 10^6$ | $10^7 \leq$ | A |
| Ex. 8 | A | $3.3 \times 10^6$ | $10^7 \leq$ | A |
| Ex. 9 | A | $2.3 \times 10^6$ | $10^7 \leq$ | A |
| Ex. 10 | A | $2.0 \times 10^6$ | $10^7 \leq$ | A |
| CEx. 1 | A | $210 \times 10^3$ | $100 \times 10^3$ | A |
| CEx. 2 | A | $360 \times 10^3$ | $100 \times 10^3$ | A |
| CEx. 3 | A | $170 \times 10^3$ | $97 \times 10^3$ | A |
| CEx. 4 | A | $36 \times 10^3$ | $6.4 \times 10^3$ | A |
| CEx. 5 | A | $53 \times 10^3$ | $6.1 \times 10^3$ | A |
| CEx. 6 | A | $12 \times 10^3$ | $2.5 \times 10^3$ | B |
| CEx. 7 | A | $8 \times 10^3$ | $9 \times 10^3$ | A |
| CEx. 8 | A | $7 \times 10^3$ | $9 \times 10^3$ | B |
| CEx. 9 | A | $3.3 \times 10^6$ | * | B |

Ex. = Example, CEx. = Comparative Example
A = Excellent, B = Defective
* = Not printable due to an increased viscosity

EXAMPLE 11

A 1-gallon kneader of stainless steel (supplied by Inoue Seisakusho) was charged with 250 parts of a red quinacridone pigment (Hostarperm Pink E, supplied by Hoechst Industry Ltd.), 2,500 parts of sodium chloride, 10 parts of a red color pigment dispersing agent (P-[CH$_2$NH(CH$_2$)$_4$N(CH$_3$)$_2$]$_3$, P=quinacridone residue) and 160 parts of polyethylene glycol 300 (supplied by Tokyo Kasei Kogyo Co., Ltd.), and these components were kneaded for 3 hours. The resultant mixture was poured into 2.5 l of warm water and stirred with a high-speed mixer under heat at about 80° C. for about 1 hour to form a slurry. The slurry was filtered and washed with water repeatedly 8 times to remove the sodium chloride and the solvent, whereby an aqueous pigment dispersion (pigment dispersion treated with pigment derivative) having a solid content of 50% was obtained.

The following materials were placed in a sand mill and dispersed to prepare a concentrated recording liquid for inkjet. The amount of the terpolymer was an amount as a solid content.

| | |
|---|---|
| Red pigment (pigment dispersion treated with pigment derivative, solid content 50%) | 30 parts |
| Acrylic resin (Joncryl 62, solid content 34.0%, supplied by Johnson Polymer corp.) | 2.0 parts |
| Dispersing agent (Emulgen A-90, supplied by Kao Corp.) | 1.0 part |
| Deionized water | 50.0 parts |
| Ethylene glycol | 3.0 parts |

The resultant dispersion was mixed with the following materials. Then, the mixture was filtered through a membrane filter having a pore size of 0.45 μm to obtain an ink. The ink had a viscosity of 1.7 cps. The ink was measured for an average particle diameter in the same manner as in Example 1 to show 91 nm.

| | |
|---|---|
| (The above dispersion | 13.5 parts) |
| Dispersing agent (Emulgen A-90, supplied by Kao Corp.) | 0.2 part |
| Terpolymer obtained in Synthesis Example 4 | 4.0 part |
| Diethylaminoethanol | 0.5 part |
| Ethylene glycol | 2.0 parts |
| Biocide (Sodium Omadine, supplied by Olin Corp.) | 0.15 part |
| Sodium ethylenediamine tetracetate | 0.02 part |
| Sodium thiocyanate | 0.4 part |
| Deionized water | 82.51 parts |

The above-obtained ink was charged into a cartridge of an inkjet printer HG5130 supplied by Seiko Epson Corp., a cartridge of a printer "ThinkJet" supplied by Japan Hewlett Packard Ltd. and a cartridge of an inkjet printer GXI-S supplied by Hitachi Ltd., and used for recording to give excellent recorded products. When water was dropped on each print surface to see whether or not the ink would bleed, the ink did not bleed and had sufficient water resistance.

EXAMPLE 12

A treated pigment aqueous dispersion having a solid content of 50% was obtained in the same manner as in Example 1 except that the crude copper phthalocyanine was replaced with 280 parts of a yellow pigment (Hansa Brilliant Yellow 9GX, supplied by Hoechst Industry Ltd.) and that the blue color pigment dispersing agent was not used.

A recording liquid of an aqueous pigment dispersion was prepared by mixing the following materials.

| | |
|---|---|
| Yellow pigment (treated pigment aqueous dispersion having a solid content of 50%) | 55 parts |
| Acrylic resin solution (Joncryl 61J, supplied by Johnson Polymer Corp.) | 7 parts |
| Dispersing agent (Emulgen A-90, supplied by Kao Corp.) | 4 parts |
| Purified water | 56 parts |
| Diethylene glycol monobutyl ether | 3 parts |

| | |
|---|---|
| N-methyl-2-pyrrolidone | 3 parts |
| 2,4,7,9-tetramethyl-5-decyn-4,7-diol | 1 part |
| Ethylene glycol | 1 part |

The mixture of the above materials was dispersed with a sand mill for 2 hours, and then mixed with the following materials. The mixture was centrifugally separated to remove coarse particles, and filtered through a membrane filter having a pore size of 1 μm and then through a membrane filter having a pore size of 0.45 μm, to give a recording liquid. The recording liquid had a viscosity of 3.0 cps. The recording liquid was measured for an average particle diameter in the same manner as in Example 1 to show 106 nm.

| | |
|---|---|
| (The above dispersion | 13.0 parts) |
| Dispersing agent (Solsperse 27000, supplied by Zeneca K.K.) | 0.3 part |
| Terpolymer obtained in Synthesis Example 5 | 5.0 parts |
| Diethylaminoethanol | 0.3 part |
| Diethylene glycol | 22.5 parts |
| Biocide (Proxel GXL, supplied by Zeneca K.K.) | 0.15 part |
| Ethylenediamine tetraacetic acid | 0.02 part |
| Deionized | 63.53 parts |
| 2,4,7,9-tetramethyl-5-decyn-4,7-diol | 0.1 part |

The above-obtained ink was charged into a cartridge of an inkjet printer HG5130 supplied by Seiko Epson Corp., and a recording was carried out to give excellent recorded products. When water was dropped on a print surface to see whether or not the ink would bleed, the ink did not bleed and had sufficient water resistance.

EXAMPLE 13

A treated pigment aqueous dispersion having a solid content of 50% was obtained in the same manner as in Example 1 except that the crude copper phthalocyanine was replaced with 280 parts of Lionol Blue KLH-T (supplied by Toyo Ink Manufacturing Co., Ltd.)

A recording liquid of an aqueous pigment dispersion was prepared by mixing the following materials.

| | |
|---|---|
| Blue pigment (treated pigment aqueous dispersion having a solid content of 50%) | 20 parts |
| Terpolymer obtained in Synthesis Example 3 | 2.8 parts |
| Dispersing agent (Solsperse 27000, supplied by Zeneca K.K.) | 4.0 parts |
| Deionized water | 74.5 parts |
| Ethylene glycol | 6.0 parts |

The mixture of the above materials was dispersed with a sand mill for 1 hour, and then mixed with the following materials. The mixture was filtered through a membrane filter having a pore size of 0.45 μm, to give a recording liquid. The recording liquid had a viscosity of 3.3 cps. The recording liquid was measured for an average particle diameter in the same manner as in Example 1 to show 97 nm.

| | | |
|---|---|---|
| (The above dispersion | 13.5 | parts) |
| Terpolymer obtained in Synthesis Example 3 | 1.8 | parts |
| Dispersing agent (Solsperse 27000, supplied by Zeneca K.K.) | 0.2 | part |
| Glycerin | 25 | parts |
| Biocide (Sodium Omadine, supplied by Olin corp.) | 0.15 | part |

| | |
|---|---|
| Sodium ethylenediamine tetraacetate | 0.02 part |
| Deionized water | 63.53 parts |
| 2,4,7,9-tetramethyl-5-decyn-4,7-diol | 0.1 part |

The above-obtained ink was charged into a cartridge of an inkjet printer HG5130 supplied by Seiko Epson Corp., and a recording was carried out to give excellent recorded products. When water was dropped on a print surface to see whether or not the ink would bleed, the ink did not bleed and had sufficient water resistance.

Further, when each of the inks obtained in Examples 1 to 13 was stored at −40° C. for 1 week and then spontaneously thawed, when each ink was stored in a constant-temperature chamber at 60° C. for 1 month, and when each ink was subjected to a 3-cycle test (one cycle consisting of storage at −40° C. for 7 hours, temperature-increase to room temperature over 3 hours, storage at room temperature for 7 hours, temperature-increase to 50° C. over 3 hours, storage at 50° C. for 7 hours and temperature-decrease to −40° C. by carrying out these steps reversely, and this cycle was repeated three times), each ink retained its initial viscosity and had stable ejection properties, and the inks retained their initial printing properties.

SYNTHESIS EXAMPLES 7–12

Terpolymers were prepared from the following monomers in molar ratios shown in the following Table by a method of producing an acrylic resin.

| Synthesis Example | Acrylic acid | Styrene | α-methyl-styrene | Acid value | Molecular weight* |
|---|---|---|---|---|---|
| 7 | 1 | 2.5 | 0.7 | 105 | 3,500 |
| 8 | 1 | 2.5 | 0.9 | 100 | 5,000 |
| 9 | 1 | 2.3 | 0.7 | 102 | 2,500 |
| 10 | 1 | 3.0 | 1.0 | 95 | 4,500 |
| 11 | 1 | 3.4 | 0.7 | 90 | 4,000 |
| 12 | 1 | 2.1 | 1.2 | 120 | 3,000 |

*Weight average molecular weight

The following materials were placed in a sand mill and dispersed to prepare a dispersion.

| | | |
|---|---|---|
| Carbon black (MA-7, supplied by Mitsubishi Chemical Co., Ltd.) | 30 | parts |
| Terpolymer obtained in Synthesis Example 7 | 3.0 | parts |
| Dimethylaminoethanol | 0.4 | part |
| Surfactant (Emulgen 420, supplied by Kao Corp.) | 1.0 | part |
| Deionized water | 50.0 | parts |
| Glycerin | 6.0 | parts |

The resultant dispersion was mixed with the following materials. Then, the mixture was filtered through a membrane filter having a pore size of 0.45 μm to obtain an ink. The ink was measured for a particle size distribution with a laser diffraction-applied particle size distribution meter ("DSL-700", supplied by Otsuka Electronics Co., Ltd.) an average particle diameter of 80 nm.

| | | |
|---|---|---|
| (The above dispersion | 13.5 | parts) |
| Surfactant (Emulgen 420, supplied by Kao Corp.) | 0.2 | part |
| Terpolymer obtained in Synthesis Example 7 | 3.8 | parts |
| Ethylene glycol | 10.0 | parts |

-continued

| | | |
|---|---|---|
| Biocide (Sodium Omadine, supplied by Olin Corp.) | 0.15 | part |
| Sodium ethylenediamine tetraacetate | 0.02 | part |
| Purified water | 63.53 | parts |

EXAMPLE 15

The following materials were placed in a sand mill and dispersed to prepare a dispersion.

| | | |
|---|---|---|
| Carbon black (Printex 40, supplied by Degsaa Japan Co. Ltd.) | 4.0 | parts |
| Blue color pigment dispersing agent (P-[CH$_2$NH(CH$_2$)$_4$N(CH$_3$)$_2$]$_3$, P = copper phthalocyanine residue) | 0.6 | part |
| Terpolymer obtained in Synthesis Example 8 | 3.0 | parts |
| Diethylaminoethanol | 0.3 | part |
| Surfactant (Emulgen 420, supplied by Kao Corp.) | 0.5 | part |
| Dispersing agent (Solsperse 27000, supplied by Zeneca K.K.) | 0.5 | part |
| Deionized water | 50.0 | parts |
| Diethylene glycol monobutyl ether | 1.0 | part |

The resultant dispersion was mixed with the following materials. Then, the mixture was filtered through a membrane filter having a pore size of 0.45 μm to obtain an ink. The ink was measured for an average particle diameter in the same manner as in Example 14 to show 85 nm.

| | | |
|---|---|---|
| (The above dispersion | 13.5 | parts) |
| Surfactant (Emulgen 420, supplied by Kao Corp.) | 0.2 | part |
| Terpolymer obtained in Synthesis Example 7 | 4.3 | parts |
| Ethylene glycol | 10.0 | parts |
| Biocide (Sodium Omadine, supplied by Olin Corp.) | 0.15 | part |
| Sodium ethylenediamine tetraacetate | 0.02 | part |
| Deionized water | 63.53 | parts |

EXAMPLE 16

The following materials were placed in a sand mill and dispersed to prepare a dispersion. Then, the mixture was filtered through a membrane filter having a pore size of 1 μm and then through a membrane filter having a pore size of 0.45 μm to obtain an ink. The ink was measured for an average particle diameter in the same manner as in Example 14 to show 94 nm.

| | | |
|---|---|---|
| Carbon black dispersion (Hostafine Black TS, pigment content 33%, supplied by Hoechst Industry Ltd.) | 9.5 | parts |
| Blue color pigment dispersing agent (P-[CH$_2$NH(CH$_2$)$_4$N(CH$_3$)$_2$]$_3$, P = copper phthalocyanine residue) | 0.1 | part |
| Dye (C. I. Direct Black 154) | 0.5 | part |
| Terpolymer obtained in Synthesis Example 8 | 3.9 | parts |
| Dimethylaminoethanol | 0.6 | part |
| Surfactant (Emulgen 420, supplied by Kao Corp.) | 0.4 | part |
| Dispersing agent (Solsperse 27000, supplied by Zeneca K.K.) | 0.5 | part |
| Diethylene glycol monobutyl ether | 1.0 | part |
| Ethylene glycol | 1.0 | part |
| Biocide (Sodium Omadine, supplied by Olin Corp.) | 0.15 | part |
| Sodium ethylenediamine tetraacetate | 0.02 | part |
| Deionized water | 83.53 | parts |

EXAMPLES 17–23

Inks were produced in the same manner as in Example 3 except that the terpolymer was replaced with the following resins. The amount of each resin refers to an amount as a solid content.

| | Resin | Acid value | Molecular weight* | Amount (part) |
|---|---|---|---|---|
| Ex. 17 | Synthesis Example 9 | 100 | 2,500 | 5 |
| Ex. 18 | Synthesis Example 10 | 95 | 4,000 | 5 |
| Ex. 19 | Synthesis Example 11 | 90 | 4,000 | 5 |
| Ex. 20 | Synthesis Example 12 | 102 | 2,500 | 4 |
| Ex. 21 | Synthesis Example 10 | 95 | 4,000 | 4 |
| Ex. 22 | Synthesis Example 11 | 90 | 4,000 | 4 |
| Ex. 23 | Synthesis Example 12 | 120 | 3,000 | 4 |

*Weight average molecular weight
Ex. = Example, CEx. = Comparative Example
A-St = styrene acrylate resin
A-emulsion 1 = styrene acrylate resin emulsion (Liocryl PFX0302, supplied by Nippon Polymer Industry Co., Ltd.)
A-emulsion 2 = Styrene acrylate resin emulsion (Tocryl S740, supplied by Nippon Polymer Industry Co., Ltd.)
Polyester = water-soluble polyester resin (Z-446, supplied by Goo Chemical Industry Co. Ltd.)

The inks obtained in Examples 14 to 23 and Comparative Examples 10 to 18 were measured or evaluated for water resistance, re-solubility, filterability, viscosity, ejection properties, resistance value and dispersibility as described later. Table 2 shows the results. Further, when the inks obtained in Examples 14 to 23 stored at −40° C. for 1 week and then spontaneously thawed, the inks retained their initial viscosity values and showed stable ejection properties. Further, when the inks obtained in Examples 14 to 23 were stored in a constant-temperature chamber at 60° C. for 1 month, the inks retained their initial viscosity values and showed stable ejection properties. Further, when the inks obtained in Examples 14 to 23 were subjected to a cycle test three times in which they were stored −40° C. for 7 hours, at room temperature for 7 hours and at 50° C. for 7 hours each cycle, the inks retained their initial printing properties and property values.

The inks were measured or evaluated as follows.

(1) Water resistance

An ink sample was charged into a cartridge of an inkjet printer ("GXII-S" supplied by Hitachi Ltd.) and used for printing on a plain paper sheet ("K" supplied by Fuji Zerox Co.,Ltd.). The printed paper was immersed in water for 1 minute to visually evaluate whether or not the ink would bleed (A: No bleeding, B: the ink bled).

Further, an ink sample was used to prepare a set-solid print on an art paper sheet, and an absorbent cotton fixed to a stick was rubbed against a set-solid print surface three times to visually evaluate a change on a print portion (A: No change, B: Changed).

(2) Re-solubility

An ink sample was dropped on a nickel plate, and dried for 2 days. Then, the nickel plate with the dry ink thereon was immersed in the same ink to visually evaluate the re-solubility (A: Dissolved, B: Not dissolved)

(3) Filterability

Evaluated on the basis of an amount of an ink which was filtered through a membrane filter having a diameter of 90 mm and a pore size of 0.45 μm for 90 seconds.

(4) Viscosity

An ink sample was measured for a viscosity at 25° C. with a vibration viscometer ("VM-1A" supplied by Yamaichi Electronic Co., Ltd.).

(5) Ejection properties

A failure of a nozzle in continuous printing was evaluated on the basis of defectiveness of a printed product (A: not defective, B: defective).

(6) Electrical resistance value

An ink sample was applied to a coat paper sheet ("2/s coated art paper" supplied by Nippon Paper Industries, Co., Ltd.) with a No. 6 bar coater, and the dried coated surface was measured for a resistance value with a resistivity meter ("MCP-T400", supplied by Mitsubishi Chemical Co., Ltd.). Further, an ink sample was heat-treated at 70° C. for 12 hours and applied to a coat paper sheet as above, and the dried coated surface was measured for a resistance value in the same manner as above.

(7) Dispersibility

An ink sample was measured for an average particle diameter. The ink sample was stored at 50° C. for 7 days, and then measured for an average particle diameter. The ink sample was evaluated on the basis of a change in particle diameter (A: Less than 15 nm, B: at least 15 nm).

TABLE 2

| | Water resistance | | | Filter-ability | Viscosity |
|---|---|---|---|---|---|
| | K | Art | Resolubility | 0.65 μm | 25° C. |
| Ex. 14 | A | A | A | 1L or more | 1.7 cps |
| Ex. 15 | A | A | A | 1L or more | 1.6 cps |
| Ex. 16 | A | A | A | 1L or more | 1.6 cps |
| Ex. 17 | A | A | A | 1L or more | 1.7 cps |
| Ex. 18 | A | A | A | 1L or more | 1.9 cps |
| Ex. 19 | A | A | A | 1L or more | 1.9 cps |
| Ex. 20 | A | A | A | 1L or more | 1.7 cps |
| Ex. 21 | A | A | A | 1L or more | 1.8 cps |
| Ex. 22 | A | A | A | 1L or more | 1.8 cps |
| Ex. 23 | A | A | A | 1L or more | 1.7 cps |

| | Ejection property | Resistance value | | Dispersibility |
|---|---|---|---|---|
| | | Before heating | After heating | |
| Ex. 14 | A | $10^6$ Ω or more | $10^7$ Ω or more | A |
| Ex. 15 | A | $10^6$ Ω or more | $10^7$ Ω or more | A |
| Ex. 16 | A | $10^6$ Ω or more | $10^7$ Ω or more | A |
| Ex. 17 | A | $10^6$ Ω or more | $10^7$ Ω or more | A |
| Ex. 18 | A | $10^6$ Ω or more | $10^7$ Ω or more | A |
| Ex. 19 | A | $10^6$ Ω or more | $10^7$ Ω or more | A |
| Ex. 20 | A | $10^6$ Ω or more | $10^7$ Ω or more | A |
| Ex. 21 | A | $10^6$ Ω or more | $10^7$ Ω or more | A |
| Ex. 22 | A | $10^6$ Ω or more | $10^7$ Ω or more | A |
| Ex. 23 | A | $10^6$ Ω or more | $10^7$ Ω or more | A |

Ex. = Example, CEx. = Comparative Example
L = liter

What is claimed is:

1. An inkjet ink consisting essentially of an aqueous liquid containing water and a water-soluble solvent, a carbon black pigment and 0.5 to 10% by weight of a water-soluble resin, the water-soluble resin being a terpolymer obtained from acrylic acid, styrene and α-methyl styrene and having a weight average molecular weight of 2,000 to 8,000 and an acid value of 90 to 130 and the styrene and the α-methyl styrene being employed in a total amount of 3 to 5 mole per mole of the acrylic acid, said ink having a resistance value, measured at an inter-electrode distance of 5 mm, of at least $10^6$Ω on a set-solid print surface.

2. A process for the production of an inkjet ink as defined in claim 1, which comprises preparing a concentrated aqueous dispersion of a carbon black pigment and a water-soluble terpolymer resin obtained from acrylic acid, styrene and α-methyl styrene and having a weight average molecular weight of 2,000 to 8,000 and an acid value of 90 to 130 and the styrene and α-methyl styrene being employed in a total amount of 3 to 5 mole per mole of the acrylic acid, adding water and an additive to the concentrated dispersion to dilute the concentrated dispersion and maintaining the diluted dispersion at a temperature between 60° and 80° C. for 5 to 48 hours the amount of the water-soluble terpolymer resin in the inkjet ink being 0.5 to 10% by weight.

3. An inkjet ink according to claim 1, wherein the terpolymer is a product obtained using 1.5 to 4.0 mol, per mole of the acrylic acid, of the styrene and 0.3 to 2.5 mol, per mole of the acrylic acid, of the α-methyl styrene.

4. An inkjet ink according to claim 1, wherein the inkjet ink contains the terpolymer and a neutralizing agent in an amount which is equimolar to an amount of the terpolymer or greater than the amount of the terpolymer by several percent.

5. An inkjet ink according to claim 1, wherein the inkjet ink contains 85 to 95% by weight of the aqueous liquid, 0.5 to 5% by weight of the pigment and 0.5 to 10% by weight of the terpolymer.

6. An inkjet ink according to claim 5, wherein the inkjet ink further contains 0.03 to 0.5% by weight of a biocide.

7. An inkjet ink according to claim 1, wherein the inkjet ink is a product obtained by filtering through a filter having a pore size of 0.65 μm or smaller.

8. An inkjet ink according to claim 1, wherein the inkjet ink has a viscosity, measured at 25° C., of 0.8 to 15 cps.

9. A process according to claim 2, wherein the additive is at least one member selected from the group consisting of a biocide, a water-soluble solvent, a dye, a neutralizing agent, a penetrant, a chelating agent, a pH adjuster, an anti-foaming agent and a dispersing agent.

* * * * *